United States Patent [19]

Jones, Sr.

[11] Patent Number: 4,549,367
[45] Date of Patent: Oct. 29, 1985

[54] APPARATUS AND METHOD FOR QUICK RELEASE MECHANISM FOR ANIMAL TRAP

[76] Inventor: Hoxie D. Jones, Sr., 17 Fifth Ave., Thomasville, N.C. 27360

[21] Appl. No.: 614,563

[22] Filed: May 29, 1984

[51] Int. Cl.⁴ .......................................... A01M 23/26
[52] U.S. Cl. .......................................... 43/88; 43/96
[58] Field of Search ................... 43/58, 88, 89, 90, 91, 43/92, 93, 94, 95, 96, 97

[56] References Cited

U.S. PATENT DOCUMENTS 1,904,188  4/1933  Zahm et al. ........................ 43/96

FOREIGN PATENT DOCUMENTS 20460 of 1902 United Kingdom .................. 43/88

Primary Examiner—Nicholas P. Godici
Assistant Examiner—Kurt Rowan
Attorney, Agent, or Firm—W. Thad Adams, III

[57] ABSTRACT

An animal trap with a quick release mechanism for releasing the jaws from the leg of a trapped animal. Several embodiments are disclosed to release the spring tension from the jaws such as by removal of the jaw springs.

7 Claims, 8 Drawing Figures

APPARATUS AND METHOD FOR QUICK RELEASE MECHANISM FOR ANIMAL TRAP

TECHNICAL FIELD AND BACKGROUND OF THE INVENTION

This invention relates to a quick release mechanism for leg hold type animal traps. The mechanism disclosed below has application on several types of animal traps. Two embodiments are disclosed below, one for a double lever-type trap and the other a so-called "jump" trap which has only one lever and one spring.

Furthermore, this invention has particular application for use on traps which do not have serrated jaws but have smooth jaws or rubber, padded jaws to trap, but not kill or injure, the animal. These traps are used to protect livestock and property from dogs and other small animals. In such cases, the object is not to kill or injure the animal but simply to trap the animal so that it can be removed from the property. In other situations, such animals are inadvertently trapped in traps which are intended to trap fur-bearing animals. In this case, it is also desirable to simply release the inadvertently trapped animal. However, in most cases the animal is in pain and will not let one get close enough to the trap to open it.

Conventional traps of the general type to which this invention relates are designed so that the jaws are always under spring tension. Ordinarily, to open the jaws of the trap and release the animal the levers must be pushed back into their open position against the pressure of the spring. In some traps, the springs are so powerful that the only way the jaws can be opened is to stand on the levers. This obviously very difficult, if not impossible, to do with an injured caught in the trap. Therefore, in many cases the animal must be rendered unconscious or even killed in order to get close enough to the trap to open the jaws. This is unnecessary, cruel and inhumane and yet the trapper understandably wants to avoid being injured himself.

SUMMARY OF THE INVENTION

Therefore, it is an object of the invention to provide a quick release mechanism for a trap which permits the trap to be opened while the trapper stands a considerable distance from the trap.

It is another object of the invention to provide a trap which can be easily released.

It is yet another object of the present invention to provide an animal trap wherein the jaws can be moved to an open position without spring tension thereon.

It is yet another object of the present invention to provide a spring-activated leg hold animal trap which permits spring tension to be released from the trap levers by means of pins which extend through the trap springs and trap levers.

These and other objects and advantages of the present invention are achieved in the preferred embodiments of the invention set forth below by providing a spring-activated, leg hold animal trap of the type wherein a pan is pivotally mounted on a trap frame in a horizontal position with a shank for engaging a dog which holds the trap in an open position. Upon depression of the pan the dog is released and at least one spring-loaded lever snaps a pair of trap jaws together. The improvement which is the subject of this application comprises a quick release mechanism for releasing the jaws from the leg of the trapped animal. This is accomplished by providing means for releasing the spring from the lever whereby the jaws are permitted to assume an open position without spring tension thereon.

According to one embodiment of the invention, the animal trap comprises the type wherein a pair of opposed levers is tensioned by an effective coil springs and are released by the dog and thereby moved towards each other and snap together a pair of pivotally mounted, U-shaped, co-acting jaws. In this embodiment, pins mount the respective levers and coil springs in a locked, spring-tensioned relation on the trap frame. The pins are mounted for releasement from the locked position whereby the levers are released from spring-tension by the spring and the jaws controlled by the levers are permitted to assume an open position without spring tension thereon.

According to another embodiment of the invention, when the dog is released a single, elongate spring lever mounted on one end of the trap frame moves away from the other end of the trap frame and snaps together a pair of pivotally mounted, U-shaped, co-acting jaws positioned within an eye in the lever spring. A passageway is defined in the lever spring from the eye to an outer edge thereof and is positioned to permit one end of the 15 jaws to pivot through the passageway without any tension thereon. Means are provided for normally closing the passageway during trap operation to maintain the jaws under spring tension but are removable from the passageway when it is desired to open the trap without spring tension on the jaw.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
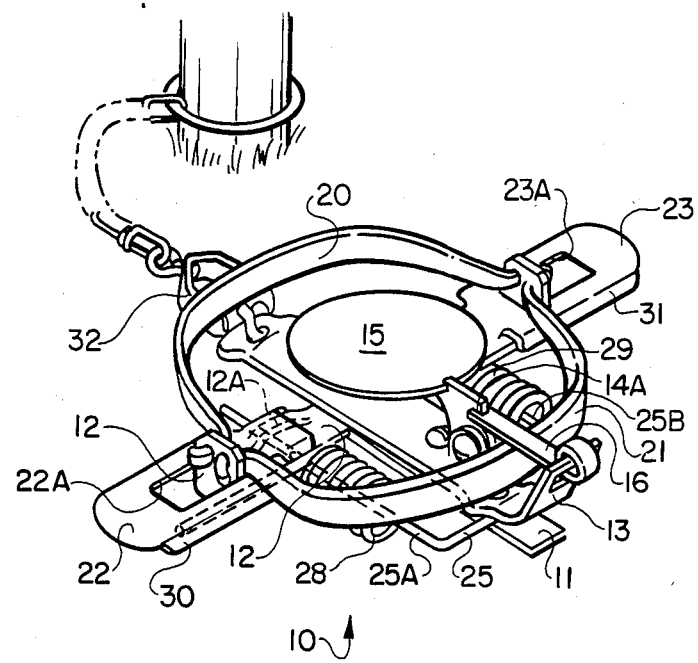
FIG. 1 is a perspective view of a double lever trap in its open, set position.

Referring now specifically to the drawings, one embodiment of the invention according to this application is shown in FIG. 1 and is broadly designated at 10. Trap 10 is formed of an elongate bottom plate 11 to which is rivoted a cross plate 12. A shank plate 13 is rivoted to bottom plate 11. A shank 14 is pivotally mounted on the top surface of shank plate 13 and has affixed to its end a circular pan 15. Shank 14 also has a notch 14a adapted to receive the free, outwardly extending end of a dog 16 which is pivotally mounted to one end of shank plate 13.

Jaws 20 and 21 are pivotally mounted on opposite, raised ends of cross plate 12 by means of curved end portions of reduced dimension which extend through suitably formed openings in cross plate 12. Jaws 20 and 21 are designed to pivot between an open position shown in FIG. 1 and a closed position shown in FIG. 2. Jaws 20 and 21 are controlled by respective levers 22 and 23. Levers 22 and 23 have centrally disposed cutouts 22a and 23a, respectively, through which the upper extending opposite ends of cross plates 12 can extend when levers 22 and 23 are in the position shown in FIG. 1. Levers 22 and 23 are pivotally mounted to cross plate 12 by means of a locking member which comprises a U-shaped spring pin 25 having opposing, parallel legs 25a and 25b. Legs 25a and 25b extend through suitably formed holes in levers 22 and 23 and also through suitably formed slots 12a in the upper surface of cross plate 12. Tension is applied to levers 22 and 23 by means of coil springs 28 and 29, respectively. One outwardly extending end of coil springs 28 and 29 is positioned under bottom plate 11 and the other, outwardly extending ends of coil springs 28 and 29 positioned under a downwardly curved lip 30 and 31, 10 respectively, of levers 22 and 23. Therefore, the levers 22 and 23 are tensioned by springs 28 and 29, respectively, such that they are urged towards an upright, vertical position.

The entire trap 10 can be anchored to a post, tree or the like by means of a swivel 32 connected to one end of bottom plate 11. A suitable cord, rope or chain is connected to swivel 32 and to, for example, the post.

Trap 10 is shown in its open, set position in FIG. 1. Dog 16 has been positioned so that it is in notch 14a of shank 14. Dog 16 extends across jaw 21 and holds jaws 20 and 21 in their open position. In this position, levers 22 and 23 are tightly tensioned by coil springs 28 and 29. Downward pressure on pan 15 moves shank 14 forward and downwardly away from dog 16. When dog 16 is released, levers 22 and 23 immediately snap towards the vertical. Jaws 20 and 21 are brought together into the position shown in FIG. 2 as levers 22 and 23 move upwardly. At their uppermost positions, levers 22 and 23 have moved jaws 20 and 21 together and the trap is in its closed position.

Figure 2:
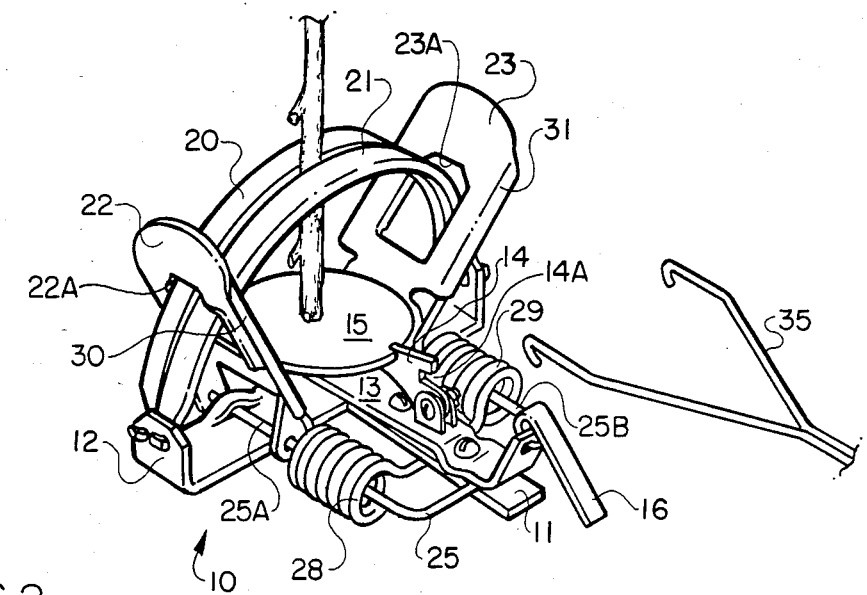
FIG. 2 is a perspective view of the trap shown in FIG. 1 in its closed position with the jaws around an object.

In ordinary, prior art traps of the general type shown in FIGS. 1 and 2, the trap can be opened only by exerting great downwardly pressure on levers 22 and 23. This permits jaws 20 and 21 to open, releasing whatever is in the trap. However, in accordance with this invention, the jaws 20 and 21 can be released without getting close to the trap and without having to depress levers 22 and 23 downwardly against the tension of springs 28 and 29. This is done by hooking some object, such as a hook 35 over spring pin 25. By pulling, spring pin 25 is pulled outwardly from the slots 12a in cross plate 12 and the holes in levers 22 and 23, releasing them. Once levers 22 and 23 are released on their pivoting position on cross plate 12, the tension exerted by springs 28 and 29 is released. Whatever is trapped in jaws 20 and 21 can escape or be easily removed. Then, the trap is reassembled by re-inserting the legs 25a and 25b back through the center of coil springs 28 and 29 through the holes in levers 22 and 23 and the slots in cross plate 12.

Figure 3:
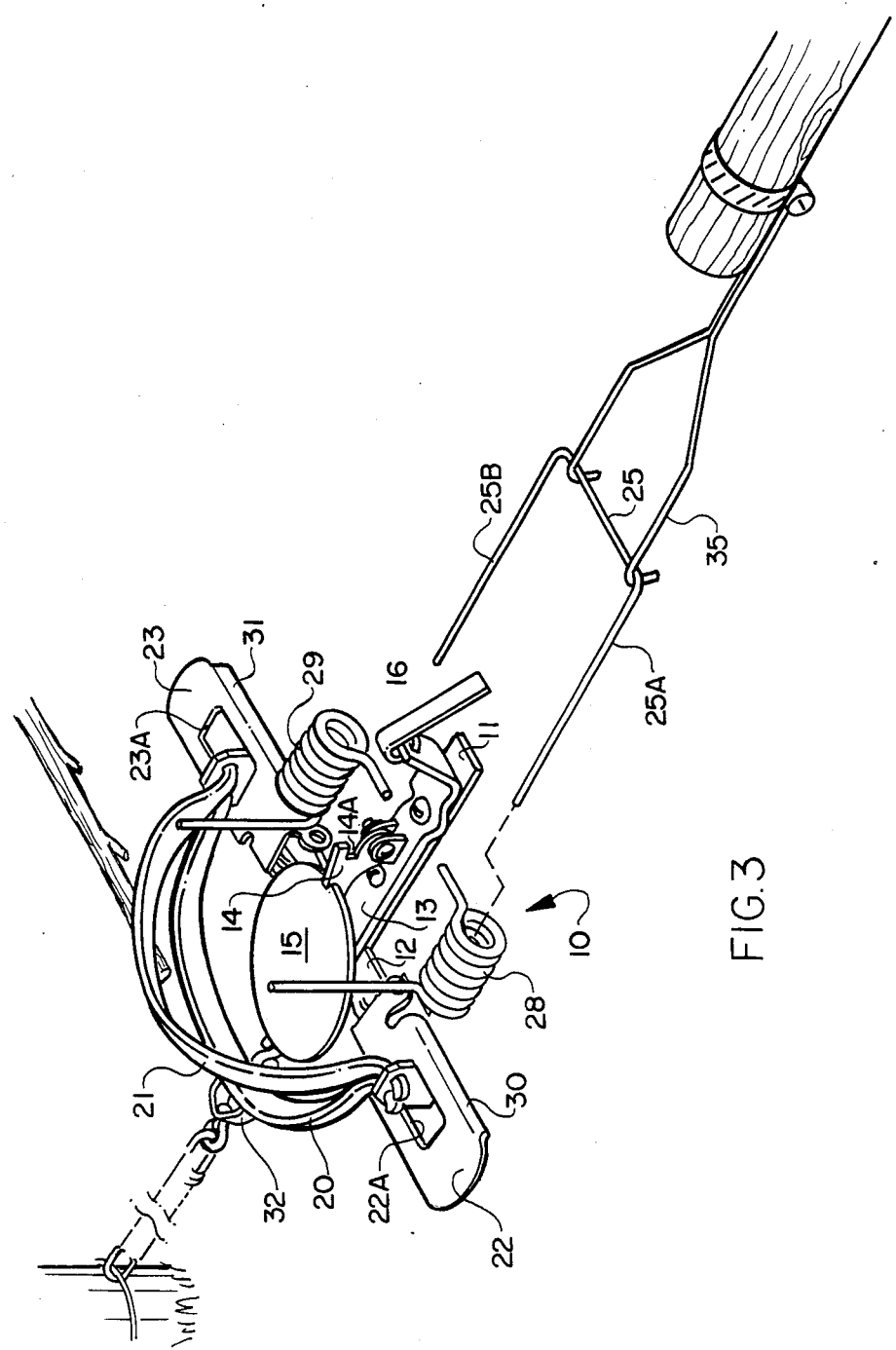
FIG. 3 is a view of the trap shown in FIG. 2 with the pin removed and the levers released from spring tension.

The trap in its disassembled form is shown in FIG. 3.

As is apparent, without the upward pressure on levers 22 and 23, there is likewise no pressure on jaws 21 and 22 and they simply fall away from whatever is trapped between them. Reassembly of trap 10 is very simple and is quickly and easily accomplished. Reassembly is aided by means of a simple tool used in the manner shown in FIG. 4. One outwardly extending end of the springs 28 is first positioned under bottom plate 11. Then, a small, hollow metal rod 36 is slipped down over the other outwardly extending end of one of spring 28.

Figure 4:
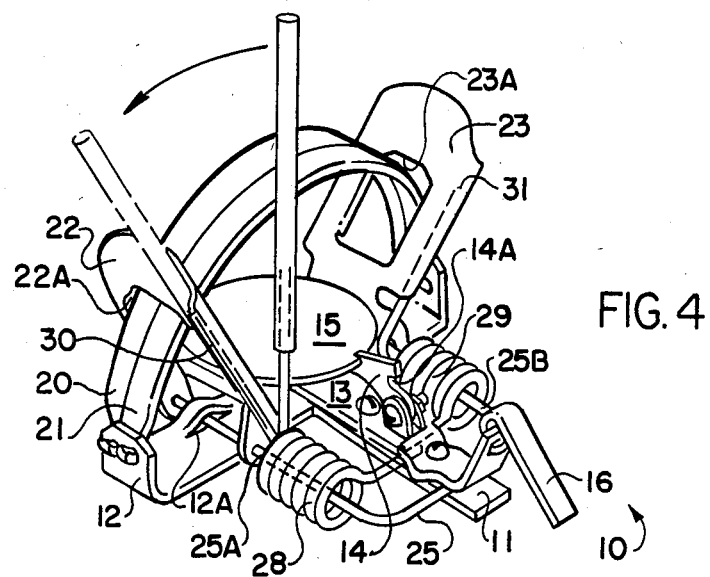
FIG. 4 shows the trap in FIGS. 1 through 3, and illustrates the use of a tool to retension the springs on the levers after the trap has been reassembled.
Figure 5:
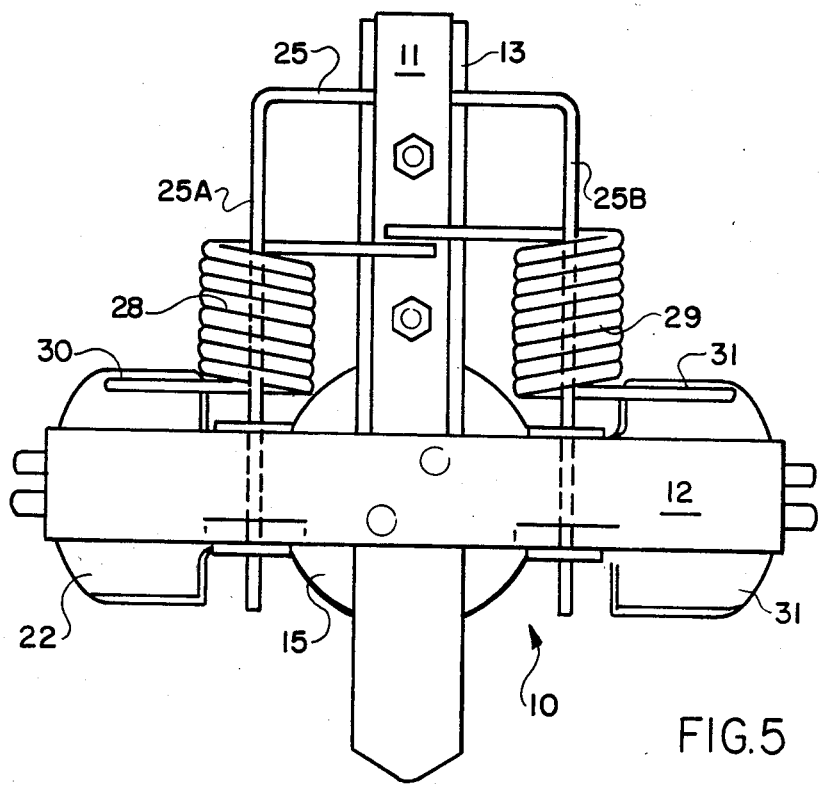
FIG. 5 is a bottom plan view of the trap shown in FIG. 2.

In the manner shown in FIG. 4, the rod acts as leverage device by which the spring can be closed slightly and the outwardly extending end of coil spring 28 repositioned under lip 30 of lever 22. The same process is repeated with lever 23, and the outwardly extending end of spring 29 is shown in its proper position under lip 31. The proper position of the opposing, outwardly extending ends of springs 28 and 29 is also shown in FIG. 5, as is the correct position of legs 25a and 25b of spring pin 25.

Figure 6:
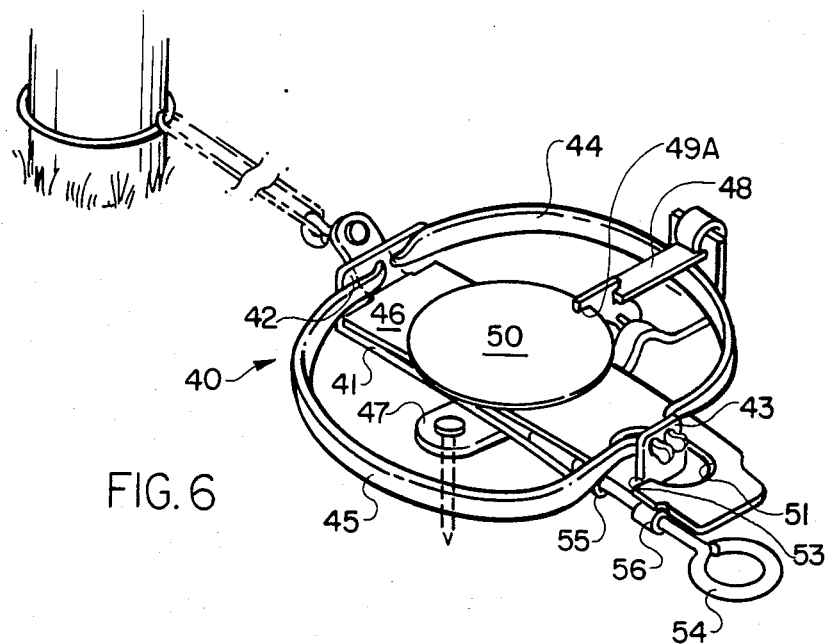
FIG. 6 is a perspective view of a jump trap in its open, set position.

Another embodiment of the invention is shown in FIG. 6. This type of trap is referred to as a jump trap and is broadly designated at reference numeral 40. Jump trap 40 includes a bottom plate 41. Bottom plate 41 is provided with opposing, upwardly extending end portions 42 and 43 having holes for receiving curved end portions of two jaws 44 and 45. Jaws 44 and 45 are activated by means of a single leaf spring 46, one end of which is positioned in a suitably formed slot in end portion 42 of bottom plate 41. Spring 46 and bottom plate 41 are both curved in such a way that they are normally biased away from each other.

A cross plate 47 is rivoted to bottom plate 41 and pivotally carries on one end thereof a dog 48. Also positioned on one end of cross plate 47 is a pivotally mounted shank 49 to which is mounted a pan 50. Shank 49 includes a notch 49a into which dog 48 is positioned when the trap is in its open, set position. This position is shown in FIG. 6. In jump trap 40, spring 46 also serves a function as a lever. An eye 51 is formed adjacent the free end of spring 46. Jaws 44 and 45 are positioned within eye 51. When pin 50 is depressed, dog 48 is removed from notch 49a and spring 46 jumps upwardly. Eye 51 quickly moves up the opposing of springs 44 and 45, bringing them quickly together in their vertical position.

Figure 7:
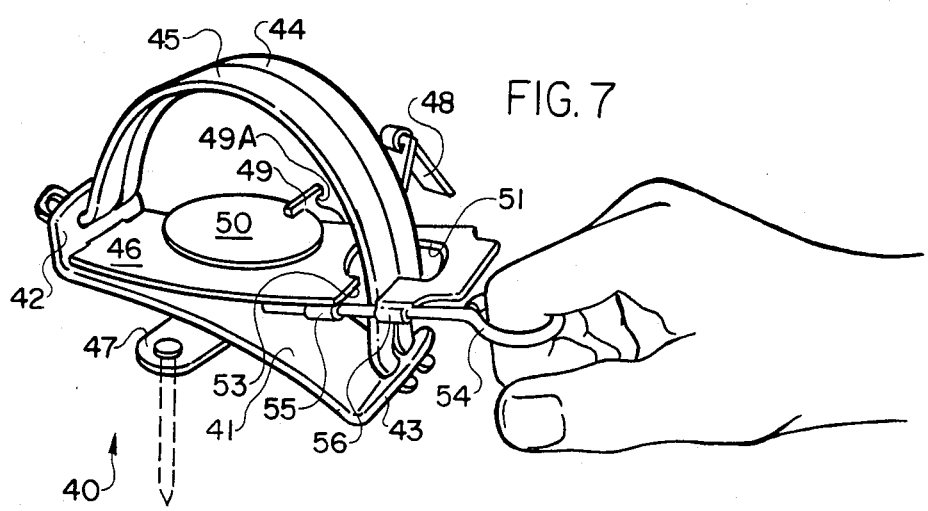
FIG. 7 shows the jump trap in FIG. 6 in its closed position.

In prior art traps of the general type shown in FIGS. 6 and 7, it would be necessary to depress spring 46 back down towards bottom plate 41 to such an extent that jaw 44 and 45 could fall open. However, in accordance with this invention, a passageway 53 is formed between eye 51 and one outer edge of spring 46. Passageway 53 is positioned such that one end of jaws 44 and 45 will pass through passageway 53 when a pin 54 is removed. Pin 54 is normally positioned across passageway 53 and held in position by a pair of eyelets 55, 56 positioned on spring 46 on opposite sides of passageway 53.

Figure 8:
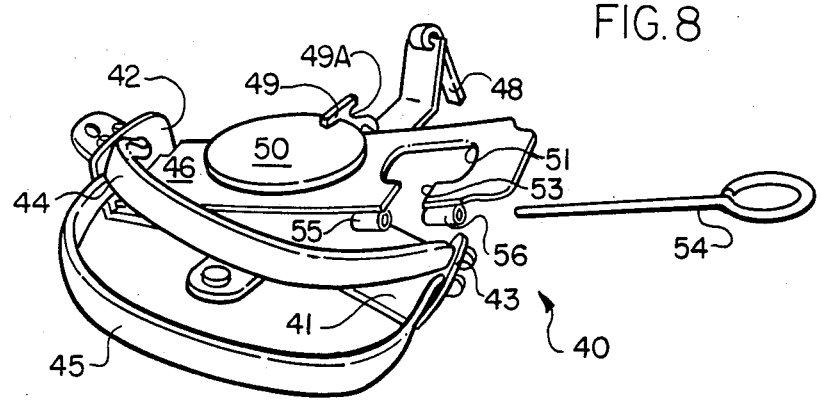
FIG. 8 shows the trap shown in FIGS. 6 and 7 with the pin removed and jaws released from spring tension.

As is shown in FIG. 8, removing pin 54 permits jaws 44 and 45 to fall through passageway 53 so that they are no longer tensioned by spring 46. To reassemble the trap, jaws 44 and 45 are repositioned in eye 53 and pin 54 is re-inserted in eyelets 55 and 56.

As with trap 10 shown in FIGS. 1 through 5, pin 54 can be removed by using a hook 35 or, in a given situation can be removed by hand, as is shown in FIG. 7. As mentioned above, it is desirable to use the hook 35 when a live animal is in the trap so that the trapper does not risk being bitten. However, when the trap is to be released for some other reason and releasement by the means described in this application is desired rather than by conventional means, the pin can be removed by hand as is shown in FIG. 7.

Two embodiments of traps having a quick release mechanism for releasing the trap jaws are described above. Various details of the invention may be changed without departing from its scope. Furthermore, the foregoing description of two preferred embodiments of the invention is provided for the purpose of illustration only and is not for the purpose of limitation-the invention being defined by the claims.

I claim:

1. A spring-activated, leg hold animal trap of the type wherein a pan is pivotally mounted on a trap frame in a horizontal position with a shank for engaging a dog which holds the trap in an open position, and upon depression of the pan the dog is released and at least one spring-loaded lever and snaps a pair of trap jaws together, the improvement comprising a quick release mechanism for releasing the jaws from the leg of the trapped animal, and comprising means for releasing the spring from the lever whereby the jaws are permitted to assume an open position without spring tension thereon, wherein the means for releasing the spring from the lever while the trap is in the open position comprises a releasable pin which holds the lever in spring-tensioned relation when in a locked position and is mounted for releasement out of the locked position into an unlocked position wherein spring tension on said lever is released.

2. An improved spring-actuated leg hold animal trap of the type wherein a pan is pivotally mounted on a trap frame in a horizontal position with a shank for engaging a dog which holds the trap in an open position and upon depression of the pan the dog is released and a pair of opposed levers tensioned by respective coil springs are released thereby move towards each other and snap together a pair of pivotally mounted, U-shaped, co-acting jaws, the improvement comprising a quick release mechanism which comprises pins mounting said respective levers and coil springs in a locked, spring-tensioned relation on the trap frame, said pins being mounted for releasement from said locked position whereby said levers are released from spring tension by said respective springs and the jaws controlled by the levers are thereby permitted to assume an open position without spring tension thereon.

3. A trap according to claim 2 wherein said pins are slidably positioned concentrically through said respective coil springs and through respective pivot bearings carried by said levers in their locked position and are released from their locked position by sliding, straight-line movement of said pins from said pivot bearings and said coil springs.

4. A trap according to claim 3 wherein said pins comprise the opposing, parallel legs of a U-shaped locking member.

5. A trap according to claim 4 and including hook means carried on the end of an elongate member whereby the trap can be released by removing the pin from the springs levers while out of reach of an animal in the trap.

6. A spring-actuated leg hold animal trap of the type wherein a pan is pivotally mounted on a trap frame in a horizontal position with a shank for engaging a dog which holds the trap in an open position and upon depression of the pan the dog is released and a single, elongate leaf spring lever mounted on one end of the trap frame moves away from the other and of the trap frame and snaps together a pair of pivotally mounted, U-shaped co-acting jaws positioned within an eye in said lever spring, the improvement comprising a quick release mechanism comprising:

(a) a passageway defined in said lever spring from said eye to an outer edge thereof and positioned to permit one end of the jaws to pivot through said passageway without spring tension thereon; and, (b) means normally closing said passageway during trap operation to maintain said jaws under spring tension, and being removable from said passageway when desired to open said trap without spring tension thereon.

7. A trap according to claim 6 wherein means normally closing said passageway during trap operation comprises first and second eyelets, one eyelet fixedly secured to said lever spring on opposite sides of said passageway and said pin being adapted to be positioned successively through said eyelets thereby closing said passageway and removed from said eyelets to open said passageway and permit the trap to be opening without tension on the jaws.

* * * * *